Figure 1:
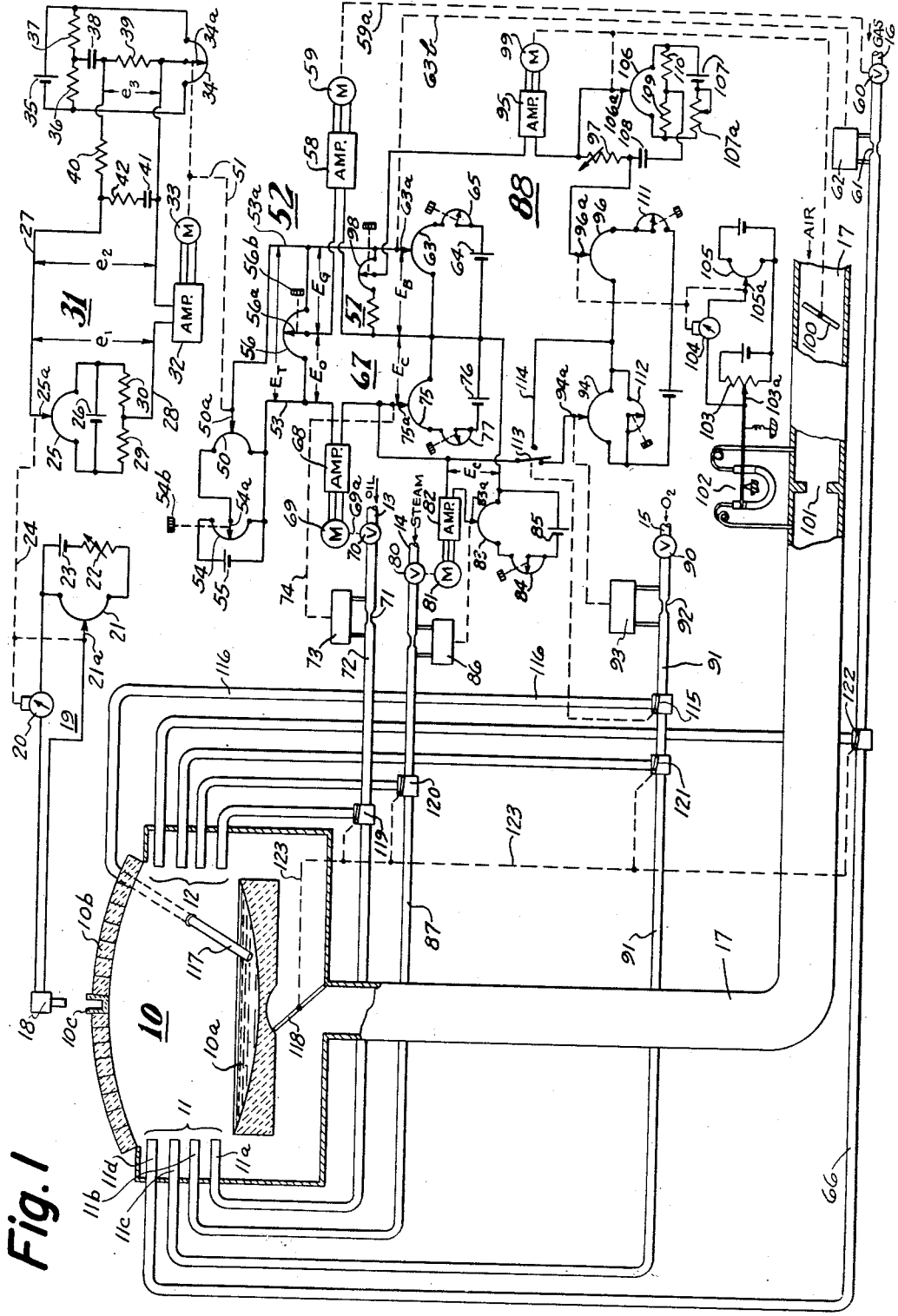

April 12, 1955

E. T. DAVIS 2,706,083

ELECTRICAL CONTROL SYSTEM

Filed Feb. 4, 1954

2 Sheets-Sheet 1

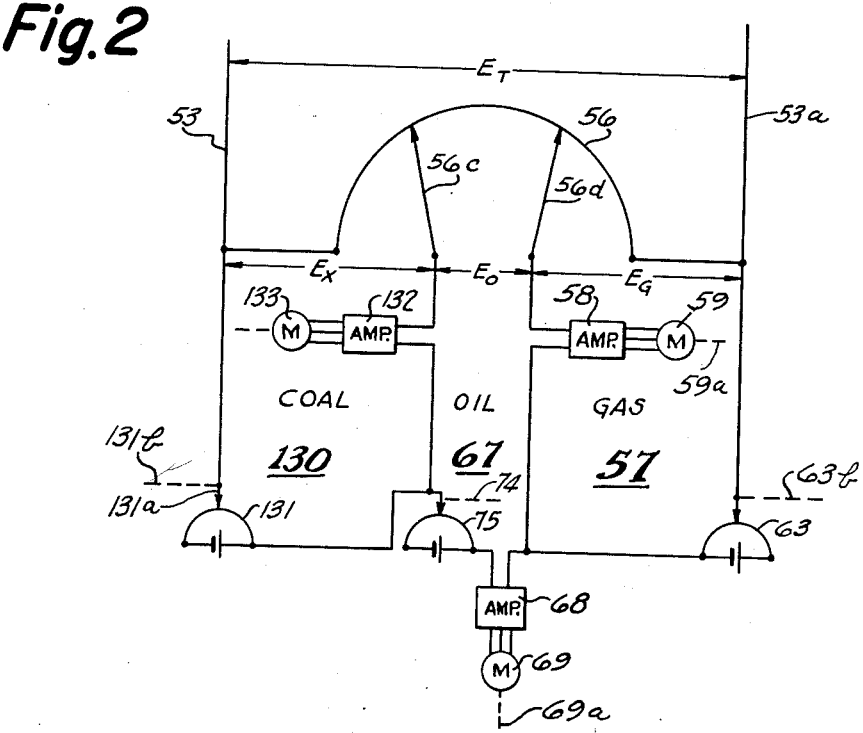

United States Patent Office 2,706,083
Patented Apr. 12, 1955

2,706,083
ELECTRICAL CONTROL SYSTEM

Elwood T. Davis, Havertown, Pa., assignor to Leeds and Northrup Company, Philadelphia, Pa., a corporation of Pennsylvania Application February 4, 1954, Serial No. 408,160

19 Claims. (Cl. 236—15)

This invention relates to electrical systems by means of which there may be regulated a plurality of condition-controlling means in a predetermined manner for producing a total condition-regulating effect and has for an object the provision of a relatively simple and thoroughly reliable arrangement in which the total condition-regulating effect is maintained, notwithstanding the failure of one of said condition-controlling means to produce a condition-regulating effect.

Though the present invention is considered to be of general application, an understanding thereof will be facilitated by an explanation of the operation of it as applied to a particular application, such as for the regulation of the total heat input to an open hearth furnace. In the operation of an open hearth furnace there may be used more than one fuel. In a typical installation, one or more burners are disposed for the combustion of various fuels, such as gas and oil. Provisions are made for the flow of combustion air, oil-atomizing steam, and in some cases for flow of a regulated amount of oxygen to the furnace.

In carrying out the invention in one form thereof, there is provided a means for producing an electrical signal which maintains a controlled variable or condition at a predetermined value. Departure of such condition from a set point is utilized to obtain a desired total condition-controlling effect to return the controlled variable to the set point. The controlled variable may be furnace temperature at a selected location. The control means may include an electrical circuit having a circuit component adjustable by the development of a voltage representative of a desired total B. t. u. (British Thermal Units) input to the furnace per unit time. A signal-dividing means, such for example, as resistors, divide the signal into a plurality of parts, one for each of a plurality of condition-controlling means. The latter include separate burners and control lines for fuel and combustion air for the furnace, together with flow-regulating valves. Balanceable networks corresponding in number with the condition-controlling means respectively have applied to them one of the divided signals. Each network has a circuit means developing therein a control signal having a magnitude related to the condition-regulating effect of its associated condition-controlling means. At least one of the balanceable networks includes circuit connections for applying thereto the total unbalance of the remaining networks. By this provision, if one of the condition-controlling means is ineffective to produce its total share of the condition-controlling effect, its corresponding balanceable network will remain partially unbalanced and the unbalance thereof will be applied to another of the networks, which, as a result, will through suitable apparatus adjust its condition-controlling means in a network-balancing direction to maintain at the open hearth furnace the desired total B. t. u. input per unit of time.

The system not only simultaneously controls in predetermined manner the operation of a plurality of condition-controlling means, but automatically readjusts the division of the total condition-controlling effect in the event of loss of fuel or failure of one of the condition-controlling means to produce all of its required change in its condition-controlling effect.

While the system is particularly useful in connection with applications like or similar to that referred to above for the open hearth furnace, it will be seen that it is equally useful for other control applications having like or similar control requirements.

For further objects and advantages of the invention and for a detailed understanding of the operation thereof, reference is to be had to the following description taken in conjunction with the accompanying drawings, in which:

Fig. 1 diagrammatically illustrates the invention as applied to an open hearth furnace; and Fig. 2 is a fractional wiring diagram illustrating a modification of the invention which may be embodied in the system of Fig. 1.

Referring to Fig. 1, the invention in one form has been shown as applied to an open hearth furnace 10 in which there is located a charge of molten metal 10a which is heated by the burning of fuel from one or the other of the banks of burners 11 and 12. The bank 11 includes an oil burner 11a, a steam nozzle 11b for the atomization of oil supplied through burner 11a. For reasons explained below, oxygen will be supplied through nozzle 11c and fuel gas through a gas burner 11d, sources of supply for each of the foregoing nozzles or burners being indicated by arrows associated with their respective labels and the illustrated supply lines 13—16. The combustion air is supplied by air line 17, it being understood that the combustion air will be preheated under the control of its own regulating system which may be of the type shown in my Reissue Patent No. 23,561, dated October 7, 1952, entitled "Automatic Control System Using Non-linear Responsive Elements." Such a control system will be utilized in conjunction with the usual checker-brick and other structural features which those skilled in the art will understand will be provided for the open hearth furnace 10, but which have been omitted in Fig. 1 for the purposes of simplicity and to avoid unnecessary complication of the drawing.

The refractory arcuate roof 10b of the furnace 10 has a refractory insert 10c closed at its lower end by a relatively thin wall, the outer surface of which follows rather closely the interior surface-temperature of the roof. By placing a radiation-responsive device 18 in position to view the thin-walled closure of insert 10c, there is provided a satisfactory measurement of said surface-temperature. Though other parameters might be selected for the control of the total heat to be generated within furnace 10, the radiation-responsive device 18, which may be of the type shown in Reissue Patent No. 23,615, Fastie, dated January 13, 1953, entitled "Compensated Thermopile," has been found satisfactory.

As illustrated, the device 18 develops a voltage of magnitude varying with change in temperature of the roof 10b. The voltage is applied to a measuring circuit 19 including a detector 20 which adjusts the contact 21a of a slidewire 21 until the voltage applied thereby to the measuring circuit is equal and opposite to that developed by the device 18. The slidewire 21 is energized through a rheostat 22 by a battery 23. The detector 20 may be of any suitable type, such for example, as that described in Williams Patent No. 2,113,164.

The detector 20 through mechanical connection 24 adjusts slidewire contact 25a relative to its slidewire 25 in accordance with increase and decrease in temperature of the roof 10b. The slidewire 25 is provided to develop in control network 31 a control voltage, of one polarity or the other dependent upon whether the temperature of roof 10b is above or below the desired temperature of the roof. It will be observed that battery 26 is connected to apply voltage to slidewire 25 and the series connected equal-valued resistors 29 and 30. By connecting conductor 28 to the junction of resistors 29 and 30 the polarity of the voltage $e_1$ between conductors 27 and 28 will be dependent upon the position of contact 25a relative to the midpoint of slidewire 25. The midpoint of slidewire 25 corresponds with the desired temperature for roof 10b.

In the description, the contacts of the slidewires are referred to as adjustable for ease in illustration and understanding of the operations. In practice, the slidewires are carried on discs and are adjustable relative to stationary contacts. Such "stationary" contacts, as required, may be adjusted for predetermining the control point. Thereafter they remain stationary until the control point is to be changed. In the specification and claims where reference is made to adjustment of a slidewire contact, it is to be understood relative adjustment between the two will meet the requirements and will be the equivalent one for the other.

In order to provide proportional plus reset plus rate control actions, the voltage $e_2$ which is developed to oppose voltage $e_1$ is obtained from the right-hand portion of the control network 31. That network is shown as of the type fully disclosed in my Patent No. 2,666,170, dated January 12, 1954, entitled "Rate and Reset Rebalanceable Control System."

As explained in that patent, an amplifier 32 controls a motor 33 which adjusts a slidewire contact 34a relative to a slidewire 34 in response to any difference between voltages $e_1$ and $e_2$. The slidewire 34 is energized by a battery 35 connected to a network including resistors 36 and 37, a reset capacitor 38 and a reset resistor 39. The network also includes a rate resistor 40 and a rate capacitor 41 having in series therewith a resistor 42.

As explained in greater particularity in my said patent, the voltage $e_2$ is produced from the potential drop $e_3$ which occurs as the result of the flow of current through resistor 39. As the current through resistor 39 must also flow through capacitor 38, that current and the voltage $e_3$ will tend to decrease as capacitor 38 acquires an opposing charge. Therefore, with $e_1$ maintained at some fixed value, amplifier 32 will operate motor 33 to move slidewire contact 34a at an average rate necessary to maintain the current through resistor 38 at a value to keep $e_2$ equal and opposite to $e_1$. This operation produces the reset action, i. e., an adjustment of the final control element by an amount proportional to the integral with respect to time of the deviation of the roof temperature from its desired value.

The voltage $e_3$ is attenuated by rate resistor 40, thus requiring the voltage $e_3$ to be larger to the extent of said attenuation in order to develop a voltage $e_2$ across the branch including rate capacitor 41 and resistor 42 equal and opposite in polarity to voltage $e_1$. By reason of the inclusion of capacitor 41, the attenuation is greater (a larger current through and potential drop across resistor 40) when the temperature at the roof changes rapidly, thus requiring a greater change in adjustment of contact 34a in order to make the voltage $e_2$ equal and opposite to the voltage $e_1$. In this connection it is to be understood that the amplifier 32 and motor 33 function to maintain $e_2$ at all times quite closely equal to $e_1$, this result being achieved by a changing average speed of the operation of motor 33 correspondingly to change the speed with which the contact 34a is moved along slidewire 34.

A contact 50a of a sidewire 50 in a ratio-determining network 52 is adjusted by motor 33, as through a mechanical connection 51. The voltage $E_T$ in network 52 appears between slidewire contact 50a and a conductor 53. The magnitude of the voltage $E_T$ is representative of the desired total heat input per unit of time to the open hearth furnace 10. For a given setting of slidewire contact 50a, the magnitude of voltage $E_T$ is determined by the position of a slidewire contact 54a of slidewire 54 energized from a battery 55. The slidewire contact 54a may be adjusted to any desired position by means of a knob 54b. With contact 54a in a selected position, it will be understood that the maximum value which $E_T$ may attain will be predetermined. By predetermining the maximum value of $E_T$, with slidewire contact 50a at the limit of its upward movement, the maximum heat input to the furnace 10 will likewise be predetermined. This is an advantageous feature of control.

The voltage $E_T$ may be considered a first electrical signal representative of the desired total condition-controlling effect in terms of total B. t. u.'s per unit of time to be supplied to furnace 10. The signal or voltage $E_T$ is then subdivided as by resistors or, as shown, by a slidewire 56 with its movable contact 56a adjustable as by a knob 56b. Thus, the voltages $E_G$ plus $E_O$ are equal to $E_T$, with the relative magnitudes of voltages $E_O$ and $E_G$ depending upon the position of movable contact 56a.

The voltage $E_G$ is applied to a balanceable network 57 which includes an amplifier 58 and a motor 59 which adjusts through connection 59a a final control element or condition-controlling means shown as the gas valve 60 in gas-supply line 16. The valve 60 is adjusted in a direction to change in line 16 the rate of flow of gas through a flow restriction 61 to burner 11d. A flow meter 62 connected across restriction 61 functions through a mechanical connection 63b indicated by the broken line to adjust a contact 63a of a slidewire 63 forming a part of the network 57. The slidewire 63 is energized from a battery 64 through a rheostat 65. The amplifier 58 and motor 59 respond to an unbalance between voltage $E_G$ and a balancing voltage $E_B$ to adjust valve 60 with movement of contact 63a in a network-balancing direction upon change of flow of gas through the restriction 61. The flow meter 62 may be of a conventional mercury-manometer type well known to those skilled in the art.

As the signal $E_G$, divided from $E_T$, changes, so will there be changed the flow of gas through the restriction 61 and through delivery line 66 to gas burner 11d. Thus, the rate of flow of gas to the furnace 10 will at all times be proportional to the magnitude of the voltage $E_G$. However, by providing the flow meter 62 responsive to flow, a further opening of valve 60 which does not increase the flow through the restriction 61, will be ineffective to produce further operation of the meter 62 and slidewire contact 63a will remain stationary and will not be moved toward a network-balancing position. Thus, network 57 will remain unbalanced, and its unbalance voltage will remain across the input circuit to the amplifier 58. The reason for emphasizing this particular aspect will later be made apparent.

Returning now to the voltage $E_O$, which it will be remembered is a signal divided from $E_T$, it will be seen that the voltage $E_O$ is applied to a second balanceable network 67. This network includes an amplifier 68 with a motor 69 driving, through connection 69a, a regulating valve 70 in the oil-supply line 13 for changing in a line 72 flow of oil through a flow restriction 71 to the oil burner 11a. A flow meter 73 of any suitable type functions through a mechanical connection 74 relatively to adjust the slidewire contact 75a with respect to its slidewire 75 for varying the magnitude of a voltage $E_C$ in a network-balancing direction. The slidewire 75 is energized from a battery 76 by way of a rheostat 77. As in the case of the regulation of the gas supply, the motor 69 in response to an unbalance between voltages $E_O$ and $E_C$ adjusts valve 70 in a direction for operation of the flow meter 73 to move slidewire contact 75a in a network-balancing direction.

It will be assumed that the oil supply 13 will be continuous and that the burner 11a is of adequate size to supply all of the heat required by furnace 10 to maintain the temperature at the roof of the furnace at its selected value. With this assumption in mind, it is to be noted that the unbalance voltage ($E_G$—$E_B$) for ampliler 58 is effectively included in the network 67. More particularly, referring to the input circuit of amplifier 68, it will be seen that the voltage applied thereto will be the algebraic sum of voltages $E_O$, $E_C$ and the unbalance voltage appearing at the input circuit of amplifier 58. If upon change of voltage $E_G$ there is lacking any change or an adequate change in voltage $E_B$ to rebalance network 57, the entire unbalance voltage will be effective at the input of amplifier 68 to effect adjustment of oil control valve 70 for a change in the oil flow, with operation of flow meter 73 producing a change in voltage $E_C$ adequate to rebalance network 67. In this manner, any lack of change in the flow of gas through restriction 61 and delivery pipe 66 to correspond with a change in voltage $E_G$ will be taken care of by a change in oil flow through the restriction 71. In short, the B. t. u. input per unit of time to the furnace 10 will be maintained proportional to $E_T$, even though there be a complete failure of gas flow through supply line 16 to the furnace 10.

In this connection, the rheostats 65 and 77 in networks 57 and 67 provide means for establishing predetermined values of $E_B$ and $E_C$ for particular positions of the slidewire contacts 63a and 75a for corresponding heat inputs to the furnace 10. More particularly, with fuel oil of a particular B. t. u. content per gallon, the rheostat 77 will be set to a corresponding position. Similarly, the rheostat 65 will be set to a position corresponding to the B. t. u.'s per cubic foot of fuel gas. In this manner, the total B. t. u. input to the furnace 10 is made proportional to the value of $E_T$. Regardless of the relative amounts of gas and oil supplied per unit of time to the respective burner nozzles 11d and 11a, the selected total B. t. u. input will be maintained.

The atomizing steam supplied by way of line 14 is under control of a valve 80 adjusted by a motor 81 under the control of an amplifier 82. The input circuit of the amplifier has applied to it the voltage $E_C$ derived from network 67 and is opposed in said input circuit by a balancing voltage derived from a slidewire 83 by its contact 83a. The slidewire has included in series with it a rheostat 84 and a battery 85. As before, a flow meter 86 connected across a restriction in delivery line 87 adjusts the position of contact 83a in a network-balancing direction. The extent of change in steam with change in oil flow may be predetermined by manual adjustment of the rheostat 84.

Though oxygen flowing by way of supply line 15 is used for lancing, an operation later to be described, it will be convenient at this time to refer to the control of the flow thereof through line 91 to nozzle 11c, as by valve 90. Though the valve 90 is manually adjusted, the rate of flow through a restriction 92 will be measured by a flow meter 93 which relatively adjusts a contact 94a relative to a slidewire 94. This slidewire is included in a further balanceable air-flow network 88 provided for the control of combustion air. In the air-flow network 88 there is applied to the input circuit of an amplifier 95 the algebraic sum of the voltage introduced by slidewire 94 and its contact 94a, representative of oxygen flow, a voltage introduced by a slidewire 96 and its contact 96a, representative of air flow, a voltage or potential difference produced across a resistor 97 provided for damping purposes, a predetermined fraction of voltage $E_B$ obtained from a signal divider shown in the form of a potentiometer including a fixed resistor and a slidewire 98 with a manually adjustable contact, and the voltage $E_C$. Thus, as voltages $E_B$ and $E_C$ change, there is applied to amplifier 95 a voltage which energizes a motor 99 in a direction to adjust an air-flow damper 100. The change in position of damper 100 changes the flow of air through a flow restriction 101. A flow-responsive device 102, shown as of the tilting manometer type, responds by changing the position of a movable contact 103a relative to a resistor 103 energized from a battery, as illustrated. The change in position of contact 103a unbalances a balanceable network also including a detector 104 and a balancing slidewire 105. The detector 104 (of the same type as detector 32 and motor 33) adjusts the position of contact 105a not only to rebalance the network, but also to adjust contact 96a of the slidewire 96 in network 88. The direction of adjustment of contact 96a is in a network-balancing direction.

With an increase of oxygen flow through restriction 92, the resultant adjustment of contact 94a will produce in network 88 the same effect as adjustment of contact 96a with an increase in air flow. As more oxygen is introduced, less combustion air is needed. The foregoing adjustments are, accordingly, made in the network to be representative of such conditions.

The motor 99 not only adjusts damper 100, but also relatively adjusts a contact 106a of a network-rebalancing slidewire 106 energized from a battery 107. The slidewire contact 106a is connected in series-circuit relation with the damping resistor 97 and a damping capacitor 108. The return circuit is by way of a conductor connected to the junction between resistors 109 and 110 connected across the respective ends of the slidewire 106.

With the contact 106a stationary in any given position, the voltage applied to the series-circuit will charge the capacitor 108. When it attains a charge equal to the applied voltage, the current through resistor 97 will be reduced to zero. However, as soon as contact 106a is moved in one direction or the other, there will be a change in potential applied to the series-circuit. Current then flows either to or from capacitor 108 to produce a potential difference across resistor 97 of one polarity or the other. The polarity of the battery 107 is in a direction for the production of a damping voltage or a potential difference across resistor 97, with movement of contact 106a in either direction of polarity producing a virtual balance of network 88 in advance of its final balance. Stated differently, the potential difference introduced by the resistor 97 opposes any change in the voltage $E_T$. The damping voltage will be of a polarity aiding the change in the voltages derived from slidewires 94 and 96 needed to balance the network. Establishing a virtual balance in advance of the final position of contacts 94a and 96a, whether the changes thereof be in directions to increase or to decrease the voltages introduced, prevents over-adjustment of the damper 100. By preventing "over-shoot," the damper 100 does not have to be returned from a position beyond that desired, and there is avoided any hunting action or other instability in the operation of damper 100. By preventing over-shoot and oscillation of damper 100 about a desired position, the effect of the voltage introduced by resistor 97 is representative of a damping function, the magnitude of which varies with the speed of motor 99, i. e., with the rate of change in position of contact 106a. The damping circuit including resistor 97 for introducing a damping effect proportional to velocity or rate of change of position of the final control element 100 may be applied to any of the other final control elements, namely, valves 60, 70 and 80. The effect and magnitude of the damping voltage for a given speed of motor 99 may be adjusted by varying resistor 97 and the setting of rheostat 107a.

It will be seen that there is included in series with the slidewire 96 a rheostat 111, which is provided for varying the ratio between fuel-flow and air-flow. By manually adjusting the position of rheostat 111, the extent of change of position of contact 96a required to rebalance the network 88 may be varied as desired, i. e., to require any desired change in the rate of flow of air through restriction 101 for a given change in voltage $E_T$.

It will be observed that a rheostat 112 is connected in shunt across slidewire 94. Rheostat 112 is manually adjustable for predetermining the equivalency between air-flow and oxygen-flow. By manually positioning rheostat 112, the magnitude of the voltage introduced by slidewire 94 for a given flow of oxygen may be established at a predetermined value.

In the control of combustion air, it is well understood by those skilled in the art that less combustion air is required for burning gas than is required for the burning of oil. Accordingly, the voltage-divider including the slidewire 98 is provided for the selection of but a fraction of the voltage $E_B$ for inclusion in network 88. The particular fraction, of course, will be established by the manual setting of the contact of slidewire 98.

In order to avoid undesired response of network 88 during "lancing," a switch 113 is provided to eliminate from the third balanceable network the voltage introduced by slidewire 94, the connections being transferred from that slidewire by way of conductor 114 directly to slidewire 96. The switch 113 is preferably operated at the same time as an oxygen-diverting valve 115 which transfers the flow of oxygen from line 91 to line 116. The oxygen then flows through line 116 to a lancing tube 117 shown as having had one end inserted into the molten metal 10a within furnace 10. During a part of the treatment of the metal in the open hearth furnace 10, it is desired to introduce oxygen for combination with impurities, this metal purifying operation being referred to by those skilled in the art as "lancing."

In my said Reissue Patent No. 23,561, I have described the provisions of the checker brick and other control problems involved in the heating of the combustion air and the reversal of the flow of that combustion air first to one side of the open hearth furnace, and then to the other side thereof. Such features of construction and control have been omitted from the present application since they form no part of the present invention. There have been illustrated in the present drawings only such features as will generally illustrate the reversal operation. Thus, when the flow-reversing valves 118—122, which may be all connected together as indicated by the broken line 123, are moved from their illustrated positions to their second control positions, the flow of combustion air, oil, steam, oxygen and gas will be to the right-hand side of the furnace as it appears in Fig. 1, instead of to the left-hand side. The control system as a whole continues to function as described above.

Now that the principles of the invention have been explained and one embodiment thereof fully described, it will be understood that modifications may be made and that certain features may be used in place of other features.

While modifications within the scope of the appended claims may suggest themselves to those skilled in the art, there has been further illustrated in Fig. 2 a fractional part of a control system illustrating how the invention may be applied to the control of a multiplicity of fuels. For such an application of the invention, the circuits of Fig. 2 will be incorporated in the system of Fig. 1. The relationship between the two figures is made apparent by like designation of like parts.

The voltage $E_T$, representative of the total heat input to the furnace 10, appears between conductors 53 and 53a. The signal-dividing slidewire 56 in Fig. 2 includes two manually adjustable slidewire contacts 56c and 56d. Thus, between conductor 53 and slidewire contact 56c a voltage Ex is developed; and there appears between the two slidewire contacts a voltage Eo; and between slidewire contact 56d and conductor 53a a voltage E_G.

It is to be here observed that movement of slidewire contact 56c will relatively change the magnitudes of the voltages Ex and Eo which are fractional parts of voltage E_T. Similar adjustment of slidewire contact 56d will relatively adjust the magnitudes of the fractional voltages Eo and E_G. While the magnitudes of the fractional voltages Ex, Eo and E_G may be changed as desired, their sum will always be equal to the voltage E_T, and changes in their respective magnitudes will not in any way change the voltage E_T which continues to have a magnitude representative of the total condition-controlling effect to be produced.

The three voltages Ex, Eo and E_G are respectively applied to balanceable networks 130, 67 and 57 respectively including rebalancing slidewires 131, 75 and 63. These slidewires are shown directly connected to batteries, it being understood that a rheostat in series with each battery will ordinarily be provided.

A detector including an amplifier 132 and motor 133 responds to the unbalance of the balanceable network 130; a detector comprising the amplifier 58 and motor 59 responds to the unbalance of network 57. Similarly, a detector comprising the amplifier 68 and motor 69 responds to the unbalance of network 67. However, it will be seen that the input circuit of the amplifier 68 has applied to it the algebraic sum of the voltages appearing in a loop which may be traced as follows: from the left-hand side of amplifier 68 the voltage introduced by slidewire 75, the voltage introduced by slidewire 131, the total voltage E_T, and the voltage introduced by slidewire 63, and by the return connection to the right-hand side of amplifier 68.

If networks 130 and 57 be in balance, then the voltages introduced by slidewires 131 and 63 will be exactly equal to voltages Ex and E_G respectively. Hence, the unbalance voltage applied to the input of amplifier 68 will be the algebraic sum of the voltages Eo and that introduced by slidewire 75. However, if networks 130 and 57 are not in balance, Ex will differ from the voltage introduced by slidewire 131, and the voltage E_G will differ from that introduced by the slidewire 63. Hence, the algebraic sum of the voltages traced above will include the unbalance voltages of networks 130 and 57.

A different analysis of the circuit yields the same result. Consider the voltages appearing in an inner loop which may be traced from the left-hand side of amplifier 68 through slidewire 75 to the amplifier 132. Any unbalance voltage appearing at its input circuit is included in the loop, which may be further traced by way of slidewire contact 56c, the mid-portion of slidewire 56, slidewire contact 56d, the input circuit of the amplifier 58, and thence by the return conductor to the right-hand side of amplifier 68. Accordingly, there has been shown how the principles of the invention may be applied to a multiplicity of fuels which are to be taken as representative of a multiplicity of condition-controlling effects, where the failure of one or more of them will produce adjustment of another of them to maintain a condition at a predetermined value, i. e., the heat input to the furnace as described in connection with Fig. 1.

The failure of any of the several condition-responsive means to produce the change in its condition-controlling effect which will make its control voltage (introduced by slidewires 131, 75 or 63) equal to its fractional voltage (Ex, Eo or E_G) results in further adjustment of another of the condition-controlling means to bring its control voltage (as from slidewire 75) to a value equal to its associated fractional voltage (Eo) and the difference between said fractional and control voltages (E_G minus E_{63}). Thus, the motor 69 by adjustment of valve 70 of Fig. 1 in conjunction with the other condition-controlling means produces the desired total condition-controlling effect.

Further in connection with Fig. 2, the motor 69, of course, may be arranged to change the feed of coal to the furnace, or it may be used to control the flow of gas to the furnace. Any particular fuel can be selected to compensate for the lack of availability of any other fuel utilized.

It is to be understood the nozzles 11a, 11b, 11c and 11d are frequently incorporated in one structure in practice, there being available on the market combination oil and gas burners provided with flow channels for air, steam and oxygen. For clarity of illustration, each nozzle has been separately illustrated in Fig. 1. It is to be understood that one or more of such nozzles may be combined into unitary structure.

While the several transfer valves 115, 119—122 have been diagrammatically shown as of the flap type, a movable element being pivoted for movement from its passage-closing position for the vertically extending pipes to a passage-closing direction of the horizontally extending pipes, it is to be understood that each of them may be of any conventional type for transferring the flow from the left-hand side of furnace 10 to the right-hand side thereof.

There may be utilized for each of the flow meters 62, 73, 86 and 93 manometers similar in structure to the manometer-type flow meter 102 illustrated as including a body of mercury in a U-tube, the level of which changes with change of flow through the restriction 101 to move the contact 103a against the bias of a spring along the length of the resistor 103. To take care of non-linearity in the response of the manometer 102 to the flow through restriction 101, the resistor 103 is preferably non-linear in character so that the voltage change produced with change in position of contact 103a will change linearly with change in flow. Of course, flow meters of other types may be utilized for the respective measurements of fluid flow, a number of them being available on the market and known to those skilled in the art.

Though a flow meter of the manometer type may be utilized for the measurement of the flow of powdered coal to a furnace and for actuating, as through mechanical connection 131b, the contact 131a of Fig. 2, other types of flow meters will sometimes be preferred for measurement of the flow of powdered coal.

What is claimed is:

1. A control system comprising means for producing a first electrical signal representative of a desired total condition-controlling effect, signal-dividing means for dividing said signal into a plurality of divided signals, a plurality of condition-controlling means, each of which produces a condition-controlling effect forming a portion of said total condition-controlling effect, means responsive to each condition-controlling effect for producing a control signal having a magnitude related to its said effect, one balanceable network associated with one of said condition-controlling means including in its input said first electrical signal and the sum of said control signals, additional balanceable networks associated with the remaining condition-controlling means and having in each of their inputs at least one of said divided signals and at least the corresponding one of said control signals, and means responsive to unbalance of each of said networks for respectively adjusting said condition-controlling means to vary the control signals in network-balancing directions.

2. The control system of claim 1 in which the condition-controlling means associated with said one balanceable network is capable of providing the total condition-controlling effect.

3. The control system of claim 1 in which said first electrical signal-producing means includes means for predetermining the maximum magnitude of the desired total condition-controlling effect.

4. The control system of claim 1 in which there is included means responsive to the control signal developed in one of said balanceable networks for producing an auxiliary controlling effect of magnitude varying with change in magnitude of said control signal.

5. The control system of claim 1 in which there is included in at least one of said networks a means adjustable with its associated said condition-controlling means for inserting into its associated balanceable network an anticipatory signal which varies with the rate of adjustment of its said condition-controlling means for attaining a virtual balance of the network in advance of final balance thereof.

6. The control system of claim 1 in which said signal-dividing means is a voltage divider adjustable to change the fractional sizes of said divided signals without affecting the magnitude of said first signal representative of said total condition-controlling effect.

7. The control system of claim 1 in which each of said networks having one of said divided signals applied thereto has associated therewith means for adjustment of the magnitude of the control signal developed therein for calibration of each said network in terms of the effectiveness of the associated condition-controlling means on the total condition-controlling effect.

8. A control system comprising means for producing a first electrical signal representative of a desired total condition-controlling effect, signal-dividing means for dividing said signal into a plurality of divided signals, a plurality of condition-controlling means for producing said total condition-controlling effect, balanceable networks corresponding in number with the number of said condition-controlling means, said networks respectively having applied thereto one of said divided signals and having circuit means developing therein a control signal having a magnitude related to the condition-controlling effect produced by one of said condition-controlling means, one only of said balanceable networks having circuit connections for applying thereto the total unbalance of the remaining balanceable networks, and means responsive respectively to the unbalance of each of said balanceable networks for adjusting said condition-controlling means in directions to produce control signals in said networks of network-balancing character.

9. A control system comprising means for producing a first electrical signal representative of a desired total condition-controlling effect, signal-dividing means for dividing said signal into a plurality of divided signals, a plurality of condition-controlling means for producing said total condition-controlling effect, balanceable networks corresponding in number with the number of said condition-controlling means, said networks respectively having applied thereto one of said divided signals and having circuit means developing therein a control signal having a magnitude related to the condition-controlling effect produced by one of said condition-controlling means, one of said balanceable networks having circuit connections for applying thereto the total unbalance of the remaining balanceable networks, and means for respectively adjusting said condition-controlling means in directions to produce control signals in said networks of network-balancing character.

10. A combustion control system for a furnace supplied by multiple fuels comprising means for producing a first electrical signal representative of a required total B. t. u. rate to be supplied by the multiule fuels, a potentiometer for dividing said signal into a plurality of signals, each representative of the B. t. u. rate to be supplied by one of the fuels, a plurality of means, one for each fuel, for controlling the rate of feed of each fuel, balanceable networks corresponding in number with said fuel rate-controlling means, said networks respectively having applied thereto one of said divided signals and having circuit means for developing therein a control signal proportional to the rate of fuel feed, one of said balanceable networks having circuit connections for applying thereto the total unbalance of the remaining balanceable networks, and means for respectively adjusting said fuel rate-controlling means in directions to produce control signals in said networks of network-balancing character.

11. A combustion control system as in claim 10 in which each of said networks includes means for adjusting the magnitude of each said control signal produced by change in the fuel rate control means in accordance with the B. t. u. content per unit-measure of the fuel.

12. In a control system, the combination of a control network, means for applying to said network a voltage of magnitude representative of a desired total condition-controlling effect, resistance means having circuit connections to which said voltage is applied and having circuit connections thereto for developing voltages of magnitude fractionally related to said total voltage, a plurality of condition-controlling means, each of which produces a portion of said total condition-controlling effect, a balanceable network for each said condition-controlling means, circuit connections for applying to each of said balanceable networks one of said fractional voltages, means included in each of said networks for producing a control signal in circuit-balancing direction and of magnitude related to the magnitude of the condition-controlling effect produced by its condition-controlling means, each said balanceable network having means for adjusting said condition-controlling means in response to network unbalance, and one of said balanceable networks including circuit connections for applying thereto any remaining unbalance of the remaining networks.

13. The combination set forth in claim 12 in which each of said networks includes a circuit component adjustable for predetermining the magnitude of the control signal developed by adjustment of said condition-controlling means to a value representative of the magnitude of the condition-controlling effect produced thereby.

14. A combustion control system for a furnace supplied by multiple fuels comprising a balanceable network, means including a slidewire adjustable in response to a signal upon departure of the temperature of the furnace from a set point for developing a voltage in said network representative of the total B. t. u.'s to be supplied by the multiple fuels per unit of time to maintain said temperature at said point, said network including a voltage-dividing branch including resistance means for subdividing said voltage into a plurality of fractional components, additional balanceable networks, one for each said fractional component, each said additional network including a detector, and fuel-regulating means respectively adjustable in response to operation of said detectors, each said additional network having means including a slidewire for developing a circuit-balancing voltage therein in accordance with change in fuel delivery to said furnace, at least one of said networks having an input circuit to its said detector which includes the unbalance of at least one other of said networks for producing adjustment of its associated fuel-regulating means to take care of its own unbalance and that of at least said associated network upon failure of the associated fuel-regulating means to produce the indicated fuel delivery to said furnace.

15. The combination set forth in claim 14 which includes a circuit element in each of said additional networks for changing the magnitude of said network-balancing voltage upon change in B. t. u. content of the fuel delivered to said furnace by the associated fuel-regulating means for maintaining constant the total B. t. u. rate input to the furnace with differing B. t. u. content per unit volume of fuel delivered by said fuel-regulating means per unit of time.

16. The combination set forth in claim 14 in which combustion-aiding fluid streams are supplied to said furnace, comprising fluid-regulating means for each of said aiding streams, one of said streams comprising combustion air, a balanceable network for said stream of combustion air including as a part thereof circuit elements for developing voltages therein representative of the rate of fuel delivery through each of said fuel-regulating means, a circuit element in said last-named network for developing a network-balancing voltage of magnitude changing with change in delivery of said combustion air to said furnace, and means responsive to unbalance of said last-named network for adjusting the flow of said combustion air to said furnace in a direction to produce network balance of said last-mentioned network.

17. The combination set forth in claim 16 in which said last-named network includes a compensating circuit means operable with change in flow of one of said combustion-aiding streams in network-balancing direction to diminish the flow of combustion air as the magnitude of said combustion-aiding stream increases.

18. The method of maintaining a controlled variable at a set point by adjusting a plurality of condition-controlling means to produce a desired total condition-controlling effect, which comprises generating an electrical signal representative of said desired total condition-controlling effect, sub-dividing said signal into a plurality of fractional parts, adjusting each of said condition-controlling means in accordance with the respective magnitudes of said fractional parts of said signal, generating opposing control signals, each of magnitude corresponding with the condition-controlling effect resulting from said adjustment of each said condition-controlling means, and upon failure of any of said condition-responsive means to produce the change in said condition-controlling effect which makes its said control signal equal to its said fractional signal further adjusting another of said condition-controlling means to produce said desired total condition-controlling effect.

19. The method of maintaining a controlled variable at a set point by adjusting a plurality of condition-controlling means to produce a desired total condition-controlling effect, which comprises generating an electrical signal voltage representative of said desired total condition-controlling effect, sub-dividing said voltage into a plurality of fractional voltages whose sum equals said signal voltage, adjusting each of said condition-controlling means in accordance with the respective magnitudes of said fractional voltages, generating opposing control voltages, each of magnitude corresponding with the condition-controlling effect resulting from said adjustment of each said condition-controlling means, and upon failure of any of said condition-responsive means to produce the change in said condition-controlling effect which makes its said control voltage equal to its fractional voltage further adjusting another of said condition-controlling means to bring its said control voltage to a value equal to its associated fractional voltage and the difference between said fractional and control voltages of said means which failed to produce its said indicated change in its condition-controlling effect to produce said desired total condition-controlling effect.

References Cited in the file of this patent

UNITED STATES PATENTS

| | | |
|---|---|---|
| 1,706,968 | Schleicher | Mar. 26, 1929 |
| 2,679,022 | McIlhenny | May 18, 1954 |